(12) United States Patent
Narasimha et al.

(10) Patent No.: US 9,144,100 B2
(45) Date of Patent: Sep. 22, 2015

(54) METHOD AND APPARATUS FOR RADIO LINK FAILURE RECOVERY

(75) Inventors: Murali Narasimha, Lake Zurich, IL (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 889 days.

(21) Appl. No.: 12/542,339

(22) Filed: Aug. 17, 2009

(65) Prior Publication Data
US 2011/0039552 A1 Feb. 17, 2011

(51) Int. Cl.
*H04W 72/02* (2009.01)
*H04W 76/02* (2009.01)
*H04W 28/04* (2009.01)
*H04W 36/08* (2009.01)
*H04W 74/08* (2009.01)

(52) U.S. Cl.
CPC ............ *H04W 76/028* (2013.01); *H04W 28/04* (2013.01); *H04W 36/08* (2013.01); *H04W 74/08* (2013.01)

(58) Field of Classification Search
None
See application file for complete search history.

(56) References Cited

U.S. PATENT DOCUMENTS

| 6,337,983 | B1 | 1/2002 | Bonta et al. |
| 6,512,927 | B2 | 1/2003 | Hunzinger |
| 6,553,231 | B1 | 4/2003 | Karlsson et al. |
| 7,082,303 | B2 | 7/2006 | Sayeedi et al. |
| 2008/0261600 | A1 | 10/2008 | Somasundaram et al. |
| 2008/0268849 | A1 | 10/2008 | Narasimha et al. |
| 2009/0005031 | A1* | 1/2009 | Van Lieshout et al. ........ 455/425 |
| 2009/0046573 | A1 | 2/2009 | Damnjanovic |
| 2009/0046578 | A1 | 2/2009 | Aydin et al. |
| 2009/0061878 | A1* | 3/2009 | Fischer .......................... 455/436 |
| 2009/0274086 | A1* | 11/2009 | Petrovic et al. ................ 370/312 |
| 2009/0316655 | A1* | 12/2009 | Prakash et al. ................. 370/331 |
| 2009/0323607 | A1* | 12/2009 | Park et al. ...................... 370/329 |
| 2010/0091734 | A1* | 4/2010 | Park et al. ...................... 370/331 |
| 2010/0189071 | A1* | 7/2010 | Kitazoe .......................... 370/331 |

FOREIGN PATENT DOCUMENTS

| AU | 2008301677 C1 * | 3/2009 | ............ H04W 72/04 |
| EP | 2026610 A1 | 2/2009 | |
| WO | 2008114180 A2 | 9/2008 | |

(Continued)

OTHER PUBLICATIONS

3GPP, Draft 3GPP Document: R2-081690 CR00xrl to 36331(REL-8) on Miscelaneous clarifications and corrections-v01, Mar. 2008.*
3GPP; TS 36.331; 3rd Generation Partnership Project; Technical Specification Group Radio Access Network; Evolved Universal Terrestrial Radio Access (E-UTRA); Radio Resource Control (RRC); Protocol Specification; Release 8; Jun. 2009.

(Continued)

*Primary Examiner* — Huy D Vu
*Assistant Examiner* — James P Duffy
(74) *Attorney, Agent, or Firm* — Lerner, David, Littenberg, Krumholz & Mentlik, LLP

(57) ABSTRACT

A method (300) and apparatus (200) for radio link failure recovery is disclosed. The method may include receiving (340), at a mobile station (110), an assignment of a random access preamble from a first cell (140) for use in at least one potential reestablishment cell (150). The method may include determining (360) that a radio link failure has occurred after receiving the assignment of the random access preamble. The method may include transmitting (370) the random access preamble to one of the at least one potential reestablishment cells in response to determining that the radio link failure has occurred.

16 Claims, 7 Drawing Sheets

(56) References Cited

FOREIGN PATENT DOCUMENTS

| WO | 2009044317 | A2 | 4/2009 |
| WO | 2009051534 | A1 | 4/2009 |
| WO | 2009084998 | A1 | 7/2009 |
| WO | 2009096883 | A1 | 8/2009 |

OTHER PUBLICATIONS

Patent Cooperation Treaty, "PCT Search Report and Written Opinion of the International Searching Authority" for International Application No. PCT/US2010/042574 Nov. 15, 2010, 11 pages.

European Examination Report for Application No. 10742933.4 dated Feb. 4, 2015.

* cited by examiner

METHOD AND APPARATUS FOR RADIO LINK FAILURE RECOVERY

RELATED APPLICATIONS

This application is related to the application entitled "Method and Apparatus for Mobile Communication Device Measurement Reporting," U.S. patent application Ser. No. 12/542,280 filed on Aug. 17, 2009 which issued as U.S. Pat. No. 8,457,074 on Jun. 4, 2013, and the application entitled "Method and Apparatus for Radio Link Failure Recovery," U.S. patent application Ser. No. 12/542,314 filed on Aug. 17, 2009 which issued as U.S. Pat. No. 8,774,135 on Jul. 8, 2014, each of which is filed on the same date as the present application, each of which is commonly assigned to the assignee of the present application, and each of which is incorporated herein by reference in its entirety.

BACKGROUND

1. Field

The present disclosure is directed to a method and apparatus for radio link failure recovery. More particularly, the present disclosure is directed to improving the speed of recovery upon radio link failure.

2. Introduction

Presently, wireless communication devices, such as cellular phones, personal digital assistants, cellular wireless equipped laptop computers, and other wireless communication devices, provide mobile communication ability for users. Unfortunately, a wireless communication device can drop a connection to a cellular network when it experiences radio link failure. A radio link failure occurs when a wireless communication device that is connected to a cell experiences a sudden deterioration of the signal such that normal communication can no longer be maintained. The deterioration occurs so rapidly that the link between the wireless communication device and the serving cell fails before the wireless communication device can be handed over to another cell. In a typical cellular deployment, radio link failure occurs when a wireless communication device suddenly experiences shadowing, such as when the wireless communication device turns a corner and the signal from the serving cell is obstructed by a building.

Radio link failure can also be caused by a sudden increase in interference from neighbor cells accompanied by shadowing of the serving cell. This is a significant problem in a heterogeneous network, where macro cells, femtocells, and picocells overlap on the same carrier frequency. For example, the femtocells and picocells can be deployed in homes and offices for preferential services to users. A wireless communication device connected to a macro cell can experience a sudden increase in interference from a femtocell or picocell, for example, when the user enters a building where the femtocell or picocell is located. Femtocell and picocell deployments can ultimately be quite common, such as with the introduction of long term evolution closed subscriber group cells, and there can be hundreds of such cells within the coverage of a macro cell. As a result, a wireless device is more likely to experience radio link failure in a heterogeneous network than in a conventional network.

Presently, when a wireless communication device experiences a radio link failure, it goes through a connection reestablishment procedure. Unfortunately, the current procedure has drawbacks. One drawback is the delay in reestablishment. For example, the current contention based random access procedure has significant delays due to the need to perform contention resolution. Moreover, the wireless communication device has to first acquire system information of the target cell to perform random access, and this can add significant delay to the recovery procedure. Another drawback is that the current reestablishment procedure does not adequately support home cells, such as femtocells or picocells. For example, the general assumption is that only cells at the same base station are prepared for handover. This implies that radio link failures in some scenarios involving home cells in heterogeneous networks are unrecoverable. A further drawback is that there is no mechanism to forward pending data from the source cell to a reestablishment target. This results in a loss of a substantial amount of user data. Furthermore, if reestablishment is to occur on a cell that is on a different frequency, such as when the primary interferer is a closed subscriber group cell to which the wireless communication device does not have access, there is currently no mechanism to trigger the system information acquisition of the target cell.

Thus, there is a need for an improved method and apparatus for radio link failure recovery.

SUMMARY

A method and apparatus for radio link failure recovery is disclosed. The method may include receiving, at a mobile station, an assignment of a random access preamble from a first cell for use in at least one potential reestablishment cell. The method may include determining that a radio link failure has occurred after receiving the assignment of the random access preamble. The method may include transmitting the random access preamble to one of the at least one potential reestablishment cells in response to determining that the radio link failure has occurred.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
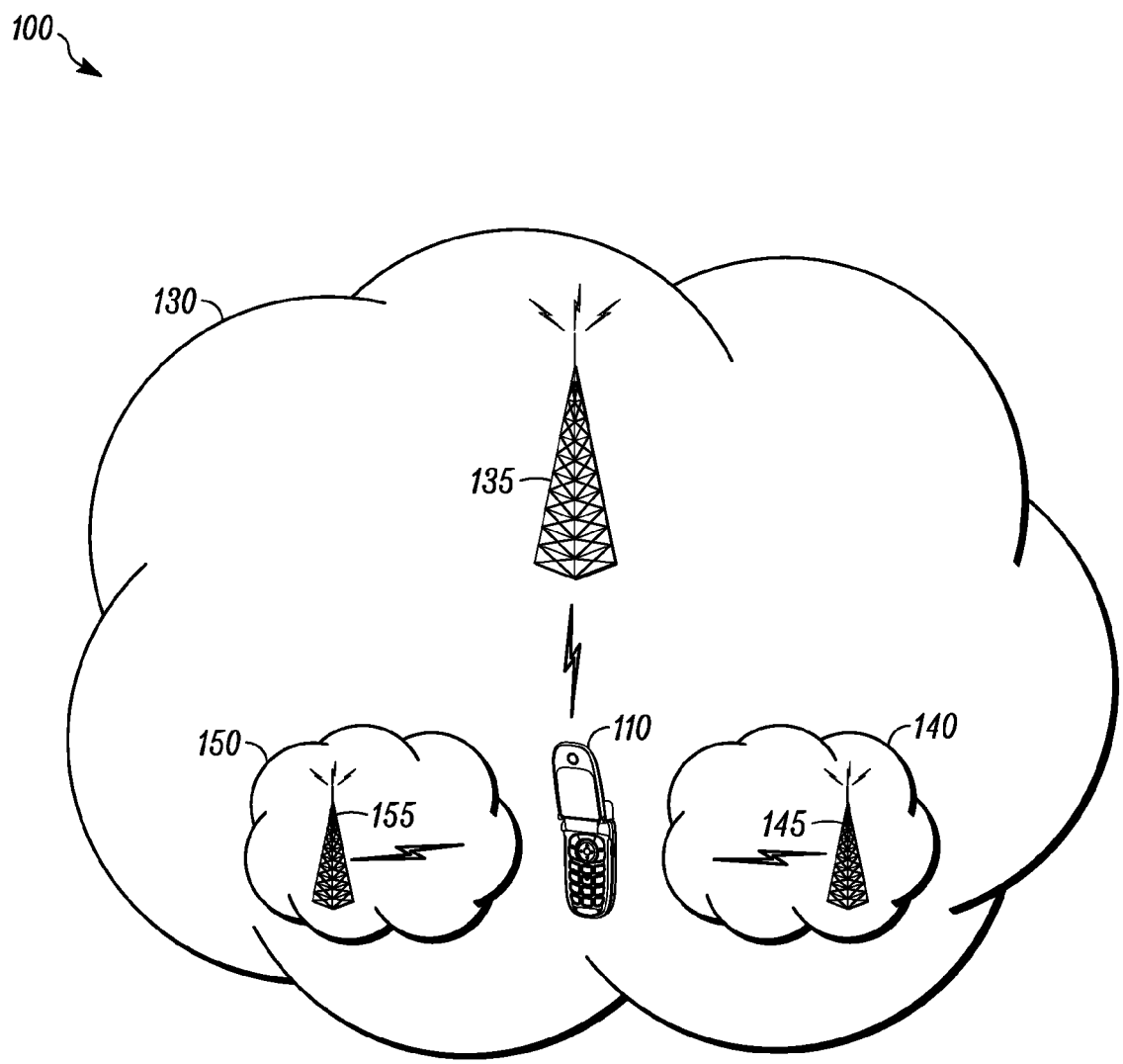
FIG. 1 illustrates an exemplary system in accordance with a possible embodiment.

FIG. 1 is an exemplary block diagram of a system 100 according to a possible embodiment. The system 100 can include a terminal 110, a serving cell 130 including a serving base station 135, a first cell 140 including a first base station 145, such as an intra-frequency neighbor base station, and a second cell 150 including a second base station 155, such as an inter-frequency neighbor base station or another intra-frequency neighbor base station. An intra-frequency neighbor base station can provide cell coverage on a same frequency as the serving base station 135. An inter-frequency neighbor base station can provide cell coverage on a different frequency from the serving base station 135.

The base stations 135, 145, and 155 can be macro base stations, home base stations, access points or other base stations. The terminal 110 may be a mobile station, such as a wireless communication device, which can be a wireless telephone, a cellular telephone, a personal digital assistant, a pager, a personal computer, a selective call receiver, or any other device that is capable of sending and receiving communication signals on a network including a wireless network. The cells 130, 140, and 150 can be macro cells or home cells, such as closed subscriber group (CSG) cells, hybrid cells, femtocells, picocells, relay nodes, or other candidate cells. For example, home cells can be cells with small footprint, such as low power as compared to a macro cell. The first cell 140 and the second cell 150 can be located within a coverage area of the serving cell 130. As a further example, the base stations 145 and 155 can be home base stations, like user base stations, home NodeBs, Third Generation Partnership Project (3GPP) home NodeBs, closed subscriber group (CSG) base stations, as defined in a third generation partnership project based standard, and/or can be any other home base station. A third generation partnership project home NodeB can also be a long term evolution (LTE) closed subscriber group or hybrid base station based on present third generation partnership project long term evolution closed subscriber group base station features. A base station can also be a Universal Mobile Telecommunications System (UMTS) home base station or a typical macro base station. Furthermore, a long term evolution closed subscriber group cell, such as the cells 130, 140, and 150, can include any cell that is a present or future result of present and/or future modified third generation partnership project long term evolution closed subscriber group cell features.

The system 100 can be a wireless telecommunications network, such as a Time Division Multiple Access (TDMA) network, like a $3^{rd}$ Generation Partnership Project (3GPP) Long Term Evolution (LTE) network, can be a Universal Mobile Telecommunications System (UMTS), and/or can be other like communications systems. Furthermore, the system 100 may include more than one network and may include a plurality of different types of networks.

In operation, the terminal 110 can receive an assignment of a random access preamble from a first cell for use in at least one potential reestablishment cell. The terminal 110 can determine that a radio link failure has occurred after receiving the assignment of the random access preamble. The terminal 110 can transmit the random access preamble to one of the at least one potential reestablishment cells in response to determining that the radio link failure has occurred.

In a corresponding operation, the base station 155 can receive a random access preamble from the terminal 110. The base station 155 can determine that the random access preamble identifies a terminal that was connected to a source base station and subsequently experienced a radio link failure. The base station 155 can transmit, to the source base station, a request to forward packets.

For example, the assumption for typical radio resource control reestablishment procedures in a conventional macro network is that a terminal is highly likely to reestablish its connection to the same cell on which it experiences radio link failure or another cell of the same base station. This assumption is not valid for heterogeneous networks. For example, if a terminal approaches a closed subscriber group cell, two following scenarios are possible. In the first scenario, a terminal is allowed to access the closed subscriber group cell, but the high signal strength of the closed subscriber group cell causes radio link failure before the network can prepare the closed subscriber group cell for handover and perform handover. In this case, the reestablishment is likely to occur on the closed subscriber group cell. In the second scenario, the terminal is not allowed to access the closed subscriber group cell, and the high signal strength of the closed subscriber group cell causes radio link failure before the terminal can be handed over to a cell on another frequency. In this case, the reestablishment is likely to occur on a cell on another frequency.

Typically, for both of the above scenarios, the reestablishment procedure can take unacceptably long, and data buffered at a source base station can be lost after radio link failure. To solve these and other problems, according to one embodiment, a preamble can be dedicated to initiate data forwarding. For example, a terminal can send a measurement report to a serving base station indicating presence of a closed subscriber group cell. The serving base station can prepare a potential reestablishment cell X for potential reestablishment. The prepared cell may be a closed subscriber group cell or a different cell. The serving base station can assign a dedicated random access channel preamble to the terminal to use for reestablishment. The dedicated preamble may be chosen by cell X, or it may be chosen by the serving cell and signaled to cell X. The serving base station can instruct the terminal to acquire system information of cell X. The system information of cell X can include one or more of a master information block, MIB, a system information block, SIB1, and a system information block, SIB2, of cell X. The serving base station can assign gaps to the terminal for system information acquisition. The terminal can acquire the required system information of cell X. If the terminal experiences radio link failure on the serving cell, the terminal can transmit the dedicated random access channel preamble to cell X. Cell X can receive the dedicated random access channel preamble and can request the serving base station to forward data. The terminal can continue the reestablishment procedure. The reestablishment is faster than typical reestablishment because the terminal has already acquired system information of cell X and because there is no delay in retrieving buffered data from the original serving base station. Multiple cells can be prepared for potential reestablishment and different random access channel preambles can be assigned corresponding to each prepared cell.

According to a related embodiment, a cell radio network temporary identifier (C-RNTI) can be assigned to reduce reestablishment signaling. For example, a terminal can send a measurement report to a serving base station indicating presence of a closed subscriber group cell or other intra-frequency cell. The serving base station can prepare a potential reestablishment cell X for potential reestablishment. The prepared cell may be a closed subscriber group cell or a different cell. The prepared cell may be an intra-frequency cell or an inter-frequency cell. The serving base station can assign a dedicated random access channel preamble to the terminal to use for reestablishment and a C-RNTI for use after reestablishment. The dedicated preamble and the C-RNTI may be chosen by cell X, or they may be chosen by a serving cell and signaled to cell X. The C-RNTI may also be the same as the one used by the UE in the serving cell. The serving base station can assign gaps for system information acquisition and can instruct the terminal to acquire a master information block, MIB, a system information block, SIB1, and a system information block, SIB2, of cell X. The terminal can acquire the required system information of cell X. If the terminal experiences radio link failure on the serving cell, the terminal can transmit the dedicated random access channel preamble to cell X. The random access response from cell X can be addressed to the C-RNTI assigned to the terminal. Alternatively, the random access response from cell X can be addressed to a random access RNTI. Cell X can receive the dedicated random access channel preamble and can request the serving base station to forward data. The terminal can continue reestablishment procedure and does not need to transmit a radio resource control (RRC) reestablishment request message. The reestablishment cell base station can transmit an RRC reestablishment message directly after transmitting the random access response. Reestablishment can be faster than typical reestablishment because the terminal has already acquired system information of cell X, there is no delay in retrieving buffered data from the original serving base station, and a RRC reestablishment request message is not needed.

According to a related embodiment, an assigned random access response radio network temporary identifier (assigned-RA-RNTI) can be used to avoid exclusive random access preamble assignment. This embodiment can allow a random access preamble to be assigned well before the occurrence of a radio link failure. The random access preamble may have to be reserved for a particular terminal for a long duration, as opposed to a typical handover situation where the random access preamble is reserved for a period of approximately 50-100 ms. However, sufficient numbers of dedicated random access preambles may not be available to reserve exclusively for this purpose, especially if the target cell is a macro cell. According to this embodiment, a terminal can send a measurement report to a source base station indicating presence of a closed subscriber group cell. A serving base station can prepare a potential reestablishment cell X for potential reestablishment, where the prepared cell may be a closed subscriber group cell or a different cell. The serving base station assigns a dedicated random access channel preamble to the terminal to use for reestablishment and an assigned-RA-RNTI to be used for the random access response. The dedicated preamble may be chosen by cell X, or it may be chosen by the serving cell and signaled to cell X. The serving base station can instruct the terminal to acquire a master information block, MIB, a system information block, SIB1, and a system information block, SIB2, of cell X. The serving base station can assign gaps for system information acquisition. The terminal can acquire the required system information of cell X. If the terminal experiences radio link failure on the serving cell, the terminal can transmit dedicated random access channel preamble to cell X. The random access response can be addressed to the assigned-RA-RNTI. Cell X can receive the dedicated random access channel preamble and can request the serving base station to forward data. The terminal can continue the reestablishment procedure. Reestablishment can be faster than typical reestablishment because the terminal has already acquired system information of cell X, and there is no delay in retrieving buffered data from the original serving base station. Furthermore, due to not reserving the random access preamble exclusively for the terminal, the efficiency of the system is improved.

According to this embodiment, the target cell X does not necessarily reserve the random access preamble exclusively for the UE. Instead, since it may not be able to determine whether the random access preamble was transmitted by the terminal that experienced radio link failure or another terminal, it can transmit two random access responses: one addressed to the assigned RA-RNTI and the other addressed to the RA-RNTI.

According to a related embodiment, reestablishment can be achieved without security reconfiguration. For example, after the terminal transmits a radio resource control (RRC) reestablishment request, the terminal typically has to undergo security reconfiguration before user data can be resumed. The reconfiguration of security parameters is typically done by transmitting a new security configuration in the RRC reestablishment message in response to the RRC reestablishment request message. This embodiment can provide the security configuration to the terminal in advance before the radio link failure occurs. For example, the terminal can send a measurement report to a source base station indicating presence of a closed subscriber group cell. The serving base station can prepare a potential reestablishment cell X for potential reestablishment, where the prepared cell may be a closed subscriber group cell or a different cell. The serving base station can transmit a reestablishment preparation message to the terminal. The reestablishment preparation message can include a dedicated random access channel preamble to use for reestablishment in cell X, a new C-RNTI for the terminal in cell X, or a security configuration to be applied by the terminal in cell X. The serving base station can also assign gaps for system information acquisition and can instruct the terminal to acquire a master information block, MIB, a system information block, SIB1, and a system information block, SIB2, of cell X. The terminal can then acquire the required system information of cell X. If the terminal experiences radio link failure on serving cell, the terminal can transmit the dedicated random access channel preamble to cell X. The terminal can then receive a random access response with an uplink grant. Cell X can receive the dedicated random access channel preamble and can request the serving base station to forward data. The terminal can apply the security configuration provided in the reestablishment preparation message and can transmit an RRC reestablishment complete message using the uplink grant. Reestablishment can be faster than typical reestablishment because the terminal has already acquired system information of cell X, there is no delay in retrieving buffered data from the original serving base station, the reestablishment procedure is shorter due to not needing a reestablishment request message and a reestablishment message, and security reconfiguration by the reestablishment message is not needed. Multiple cells can be prepared for potential reestablishment, and different random access channel preambles, C-RNTI's, and security configurations can be assigned corresponding to each prepared cell.

Figure 2:
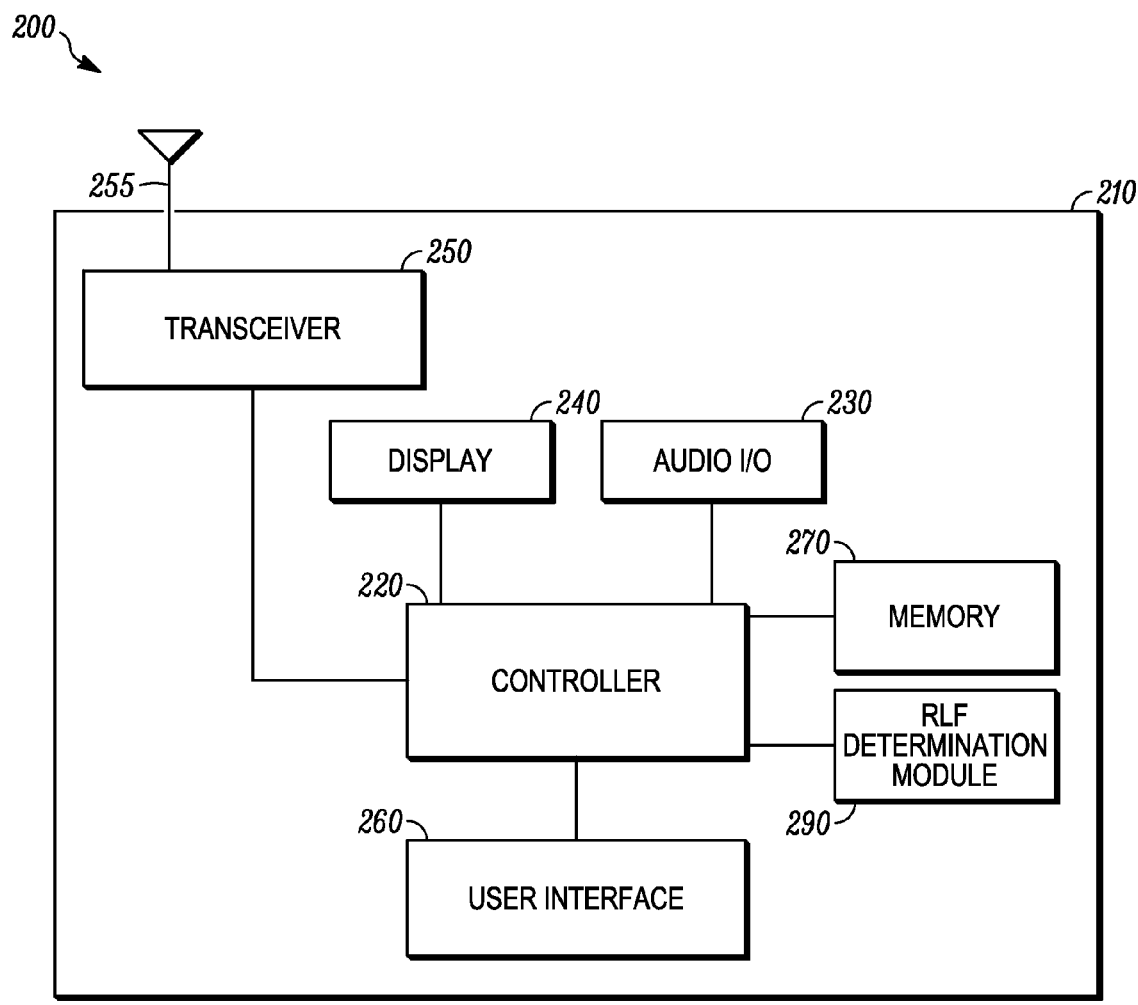
FIG. 2 illustrates an exemplary block diagram of a wireless communication device in accordance with a possible embodiment.

FIG. 2 is an exemplary block diagram of a wireless communication device 200, such as the terminal 110, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, an antenna 255 coupled to the transceiver 250, a user interface 260 coupled to the housing 210, and a memory 270 coupled to the housing 210. The wireless communication device 200 can also include a radio link failure determination module 290. The radio link failure determination module 290 can be coupled to the controller 220, can reside within the controller 220, can reside within the memory 270, can be an autonomous module, can be software, can be hardware, or can be in any other format useful for a module on a wireless communication device.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the transceiver 250 can receive an assignment of a random access preamble from a first cell for use in at least one potential reestablishment cell. The controller 220 can control operations of the apparatus and can process the assignment of the random access preamble. The radio link failure determination module 290 can determine that a radio link failure has occurred after the transceiver 250 receives the assignment of the random access preamble. The controller 220 can transmit, via the transceiver 250, the random access preamble to one of the at least one potential reestablishment cells in response to determining that the radio link failure has occurred.

The controller 220 can send, via the transceiver 250, a measurement report to the first cell. The measurement report can indicate the presence of a second cell. The transceiver can receive, after sending the measurement report, the assignment of the random access preamble from the first cell for use in the at least one potential reestablishment cell. The controller 220 can process the assignment of the random access preamble. The transceiver 250 can receive an assignment of a cell radio network temporary identifier. The controller 220 can process the assignment of the cell radio network temporary identifier. Alternately, the transceiver 250 can receive an assignment of an assigned random access response radio network temporary identifier. The controller 220 can process the assignment of an assigned random access response radio network temporary identifier. The transceiver 250 can receive a random access response message in response to transmitting the random access preamble to the one of the at least one potential reestablishment cells. The random access response message can include the assigned random access response radio network temporary identifier.

The transceiver 250 can receive security configuration information for use in the at least one potential reestablishment cell and can receive a response to the random access preamble from the one of the at least one potential reestablishment cells. The controller 220 can apply the security configuration and can transmit, via the transceiver 250, a message indicating completion of reestablishment after applying the security configuration.

Figure 3:
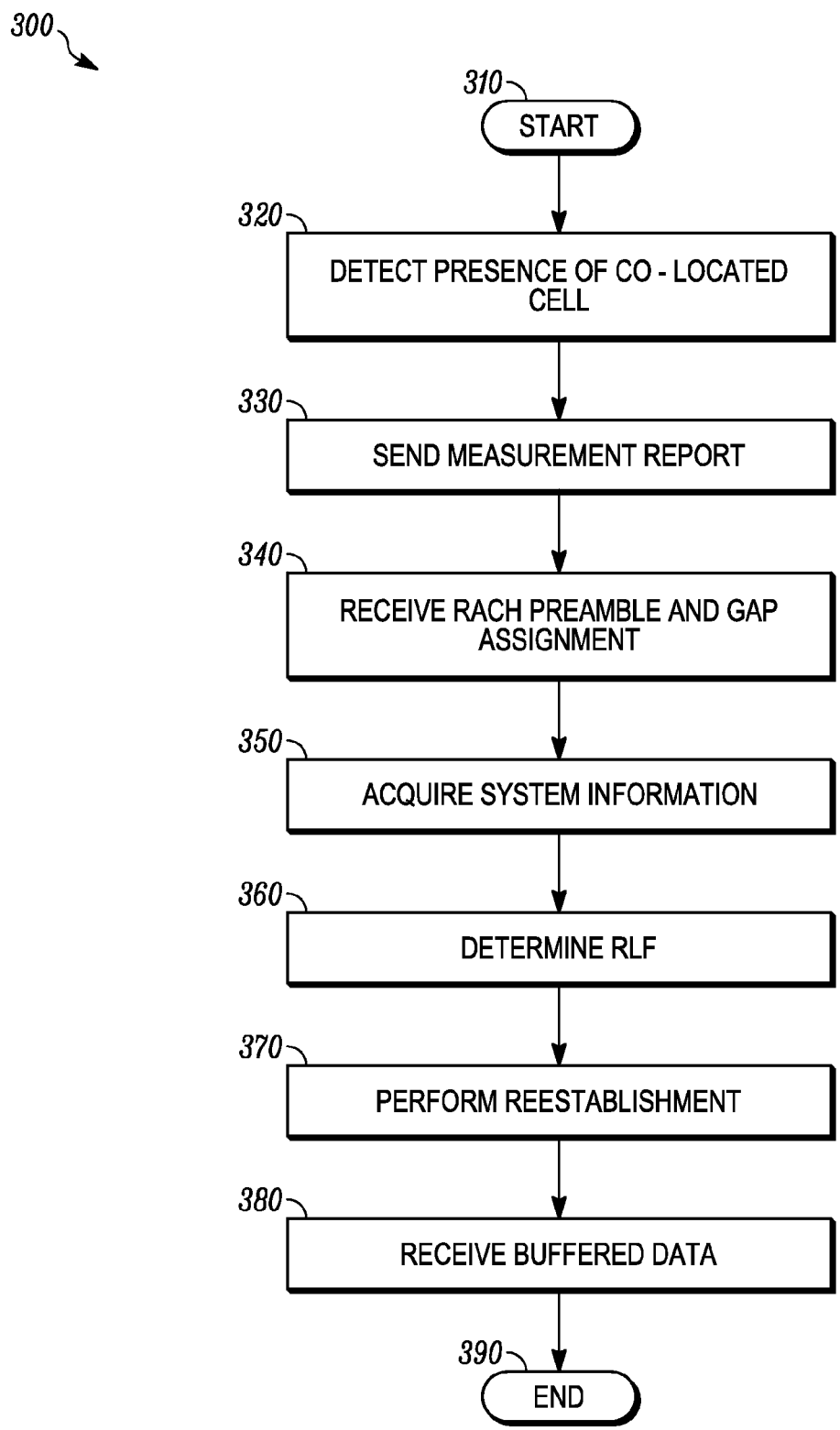
FIG. 3 is an exemplary flowchart illustrating the operation of a wireless communication device in accordance with a possible embodiment.

FIG. 3 is an exemplary flowchart 300 illustrating the operation of the wireless communication device 200 according to a possible embodiment. At 310, the flowchart begins. At 320, a co-located cell can be detected. For example, the co-located cell can be a home cell in the coverage area of a first cell. The first cell can be a serving cell or source cell. The co-located cell can operate on the same frequency as the serving cell. At 330, a measurement report can be sent to the first cell. The measurement report can indicate the presence of a second cell, such as the co-located cell. The measurement report can indicate that the second cell is a home cell.

At 340, an assignment of a random access preamble can be received from a first cell for use in at least one potential reestablishment cell. The random access preamble can be for use in a plurality of potential target cells. A gap assignment for system information acquisition can also be received. An assignment of a cell radio network temporary identifier (C-RNTI) can additionally be received. An assignment of an assigned random access response radio network temporary identifier (RA-RNTI) can further be received. For example, a typical RA-RNTI is a function of the timing when the mobile station transmits a preamble; it is not assigned to the mobile station. Security configuration information can also be received for use in the at least one potential reestablishment cell. At 350, system information can be acquired for the at least one potential reestablishment cell by using the gap assignment. At 360, an occurrence of radio link failure can be determined.

At 370, reestablishment can be performed on the one of the at least one potential reestablishment cells in response to determining that a radio link failure has occurred. When performing reestablishment, the random access preamble can be transmitted to the one of the at least one potential reestablishment cells. The at least one potential reestablishment cell may or may not include the second cell. Also, a random access response message can be received in response to transmitting the random access preamble to the one of the at least one potential reestablishment cells. The random access response message can include the assigned random access response radio network temporary identifier. Additionally, a response to the random access preamble can be received from the one of the at least one potential reestablishment cells. Furthermore, the security configuration can be applied and a message can be transmitted that indicates completion of reestablishment after applying the security configuration. At 380, buffered data is received after performing reestablishment. At 390, the flowchart 300 ends.

Figure 4:
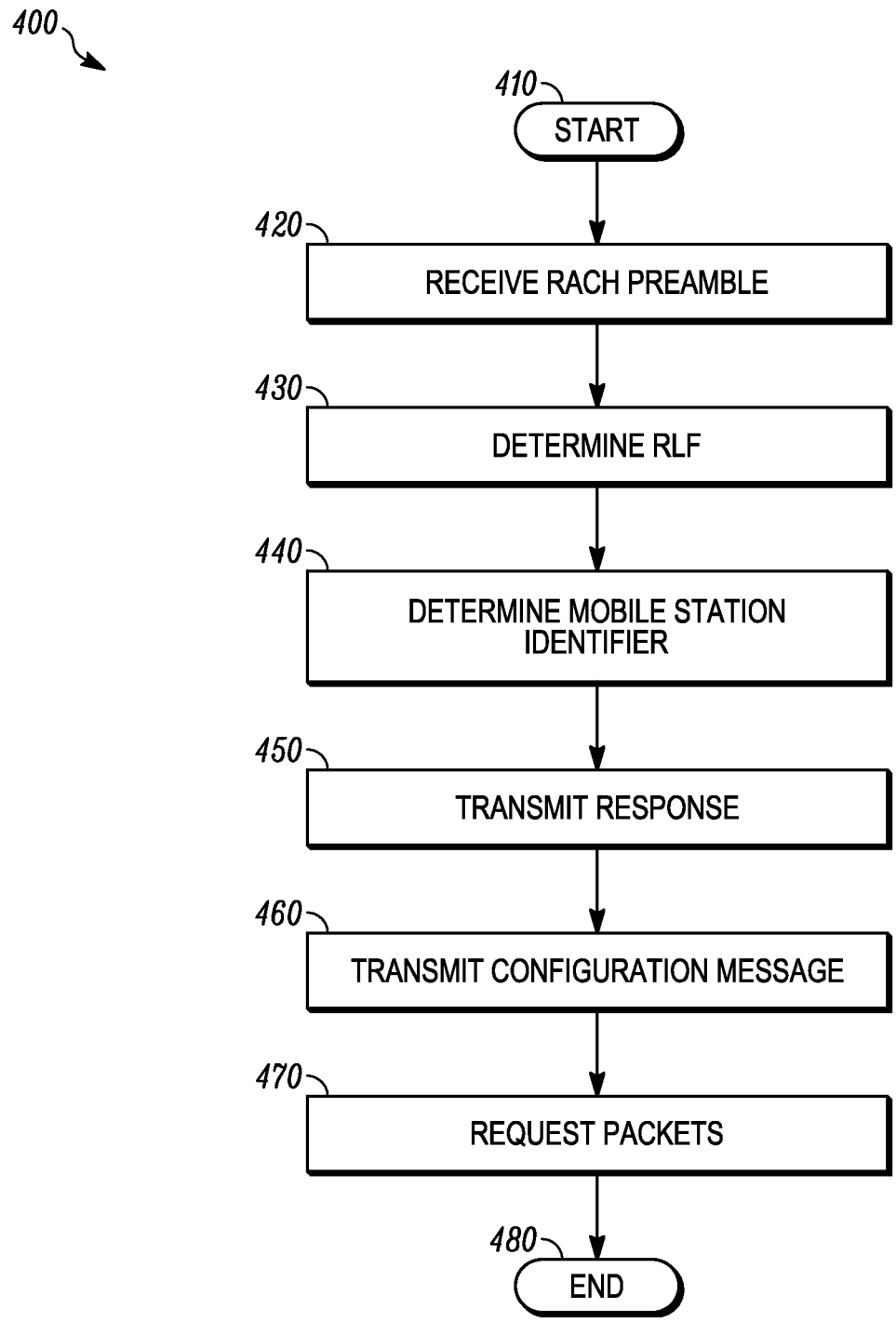
FIG. 4 is an exemplary flowchart illustrating the operation of a base station according to a possible embodiment.

FIG. 4 is an exemplary flowchart 400 illustrating the operation of a base station, such as a target base station like the base station 145 or the base station 155, according to a possible embodiment. At 410, the flowchart begins. At 420, a random access channel (RACH) preamble can be received from a mobile station. At 430, the random access preamble can be determined to identify a mobile station that was connected to a source base station and subsequently experienced a radio link failure.

At 440, a mobile station identifier, such as a cell radio network temporary identifier (C-RNTI), can be determined that identifies the mobile station. The mobile station identifier can be determined by receiving, from a source base station, the mobile station identifier that identifies the mobile station. Alternately, an assigned random access response identifier, such as an assigned random access cell radio network temporary identifier (RA-RNTI), can be determined that identifies the mobile station.

At 450, a response message can be transmitted. The response message can be addressed to the mobile station identifier. The response message can alternately be addressed to the assigned random access response identifier. At 460, a message can be transmitted to configure a connection between the target base station and the mobile station without a request from the mobile station to configure the connection. At 470, a request to forward packets can be transmitted from the target base station to the source base station. At 480, the flowchart 400 ends.

Figure 5:
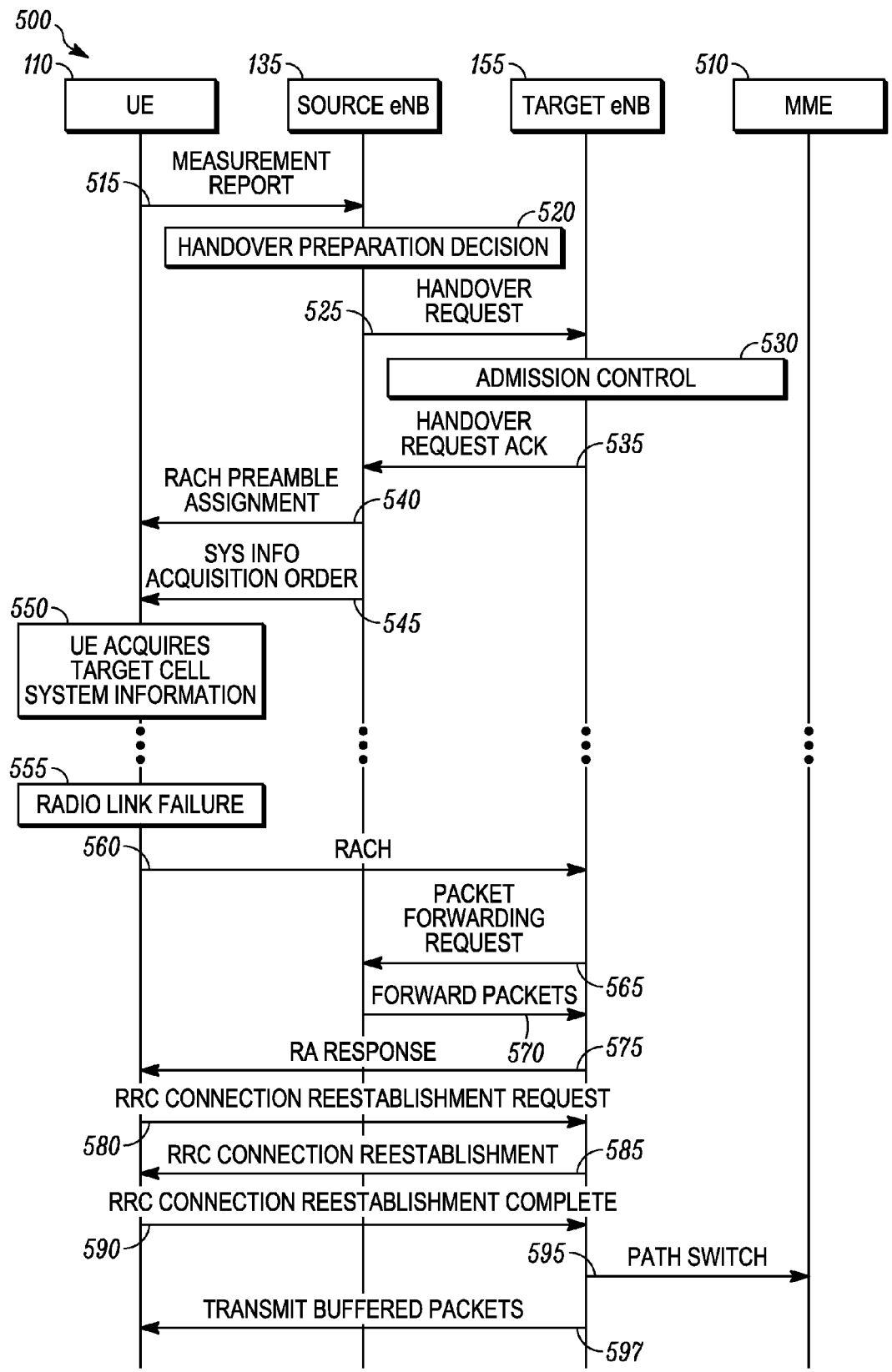
FIG. 5 is an exemplary signal flow diagram of a system according to a possible embodiment.

FIG. 5 is an exemplary signal flow diagram 500 of the system 100 according to a possible embodiment. The signal flow diagram 500 illustrates signals between the terminal 110, the serving or source base station 135, a potential target base station 155, and a mobility management entity 510. At 515, the terminal 110 can send a measurement report to the source base station 135. The measurement report can indicate the presence of a cell co-located with a cell of the source base station 135. At 520, the source base station 135 can make a handover preparation decision. At 525, the source base station can send a handover request to the target base station 155. At 530, the target base station 155 can perform admission control to determine whether the terminal 110 is allowed to connect to the target base station 155. At 535, if the terminal 110 is allowed to connect to the target base station 155, the target base station 155 can send a handover request acknowledgement to the source base station 135.

At 540, the source base station 135 can send a random access channel preamble assignment to the terminal 110. At 545, the source base station 135 can send a system information acquisition order to the terminal 110. At 550, the terminal 110 can acquire target cell system information corresponding to a target cell on the target base station 155. At 555, the terminal 110 can experience radio link failure. At 560, the terminal can send the random access preamble to the target base station 155 to request reestablishment on the target base station 155. At 565, the target base station 155 can send a packet forwarding request to the source base station 135. At 570, the source base station 135 can forward packets to the target base station 155. At 575, the target base station 155 can send a random access response to the terminal 110. At 580, the terminal 110 can send a radio resource control connection reestablishment request to the target base station 155. At 585, the target base station 155 can send a radio resource control connection reestablishment message to the terminal 110. At 590, the terminal can send a radio resource control connection reestablishment complete message to the target base station 155. At 595, the target base station 155 can send a path switch message to the mobility management entity 510. At 597, the target base station 155 can transmit buffered packets to the terminal 110.

Figure 6:
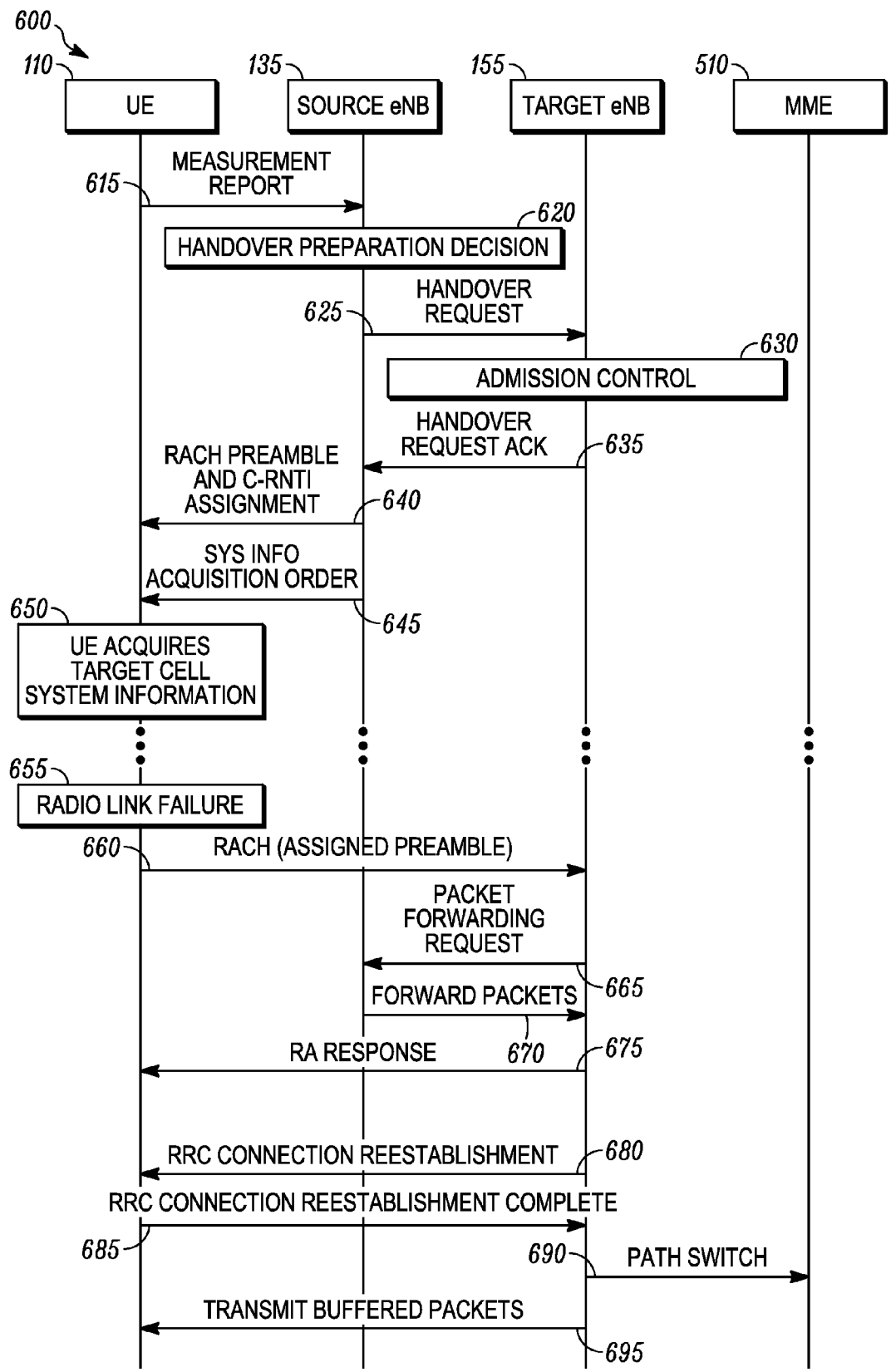
FIG. 6 is an exemplary signal flow diagram of a system according to a possible embodiment.

FIG. 6 is an exemplary signal flow diagram 600 of the system 100 according to a possible embodiment. The signal flow diagram 600 illustrates signals between the terminal 110, the serving or source base station 135, a potential target base station 155, and the mobility management entity 510. At 615, the terminal 110 can send a measurement report to the source base station 135. The measurement report can indicate the presence of a cell co-located with a cell of the source base station 135. At 620, the source base station 135 can make a handover preparation decision. At 625, the source base station can send a handover request to the target base station 155. At 630, the target base station 155 can perform admission control to determine whether the terminal 110 is allowed to connect to the target base station 155. At 635, if the terminal 110 is allowed to connect to the target base station 155, the target base station 155 can send a handover request acknowledgement to the source base station 135.

At 640, the source base station 135 can send a random access channel preamble and a C-RNTI assignment to the terminal 110. At 645, the source base station 135 can send a system information acquisition order to the terminal 110. At 650, the terminal 110 can acquire target cell system information corresponding to a target cell on the target base station 155. At 655, the terminal 110 can experience radio link failure. At 660, the terminal can send the random access preamble to the target base station 155 to request reestablishment on the target base station 155. At 665, the target base station 155 can send a packet forwarding request to the source base station 135. At 670, the source base station 135 can forward packets to the target base station 155. At 675, the target base station 155 can send a random access response to the terminal 110. At 680, the target base station 155 can send a radio resource control connection reestablishment message to the terminal 110. At 685, the terminal can send a radio resource control connection reestablishment complete message to the target base station 155. At 690, the target base station 155 can send a path switch message to the mobility management entity 510. At 695, the target base station 155 can transmit buffered packets to the terminal 110.

Figure 7:
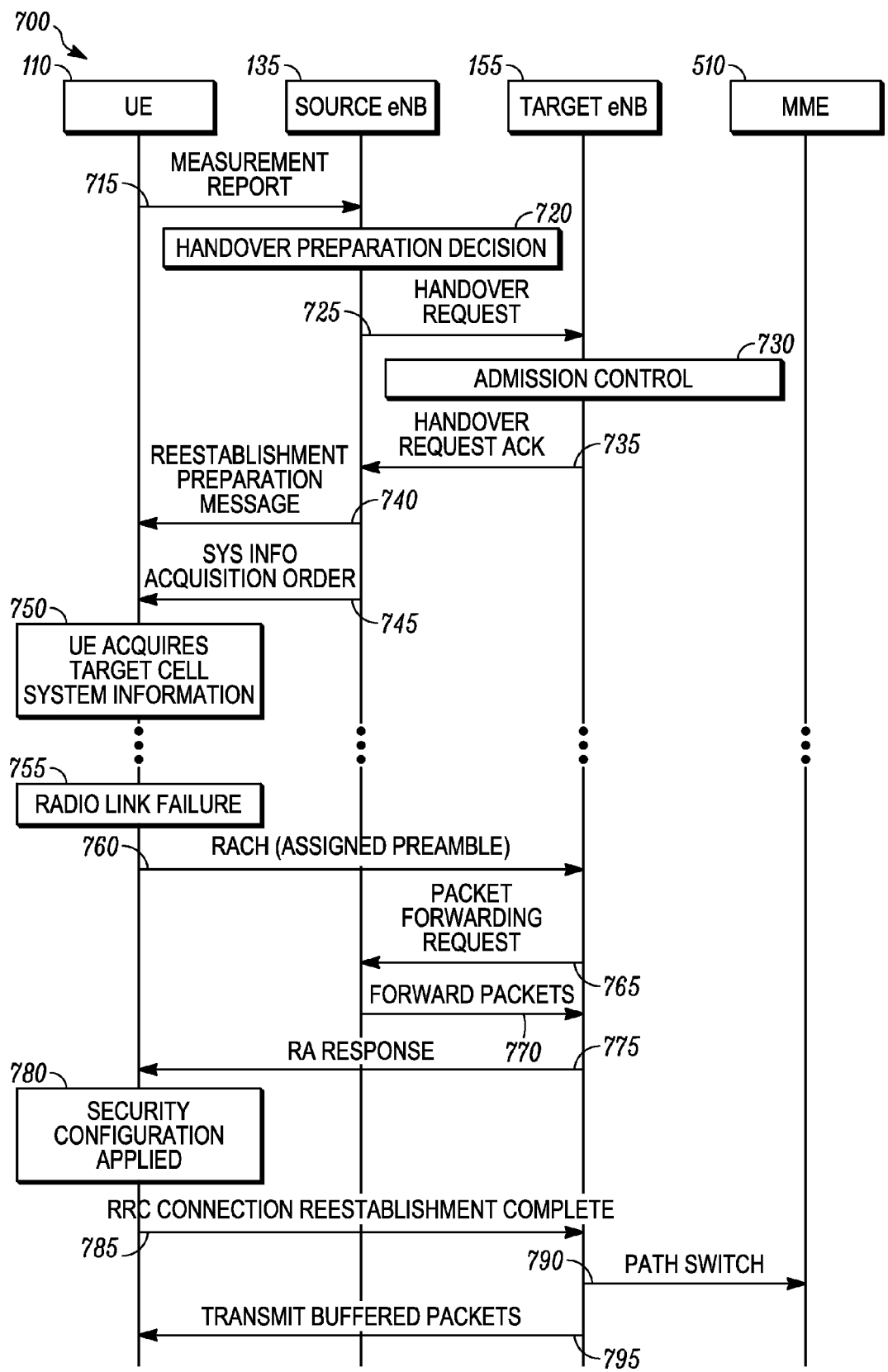
FIG. 7 is an exemplary signal flow diagram of a system according to a possible embodiment.

FIG. 7 is an exemplary signal flow diagram 700 of the system 100 according to a possible embodiment. The signal flow diagram 700 illustrates signals between the terminal 110, the serving or source base station 135, a potential target base station 155, and the mobility management entity 510. At 715, the terminal 110 can send a measurement report to the source base station 135. The measurement report can indicate the presence of a cell co-located with a cell of the source base station 135. At 720, the source base station 135 can make a handover preparation decision. At 725, the source base station can send a handover request to the target base station 155. At 730, the target base station 155 can perform admission control to determine whether the terminal 110 is allowed to connect to the target base station 155. At 735, if the terminal 110 is allowed to connect to the target base station 155, the target base station 155 can send a handover request acknowledgement to the source base station 135.

At 740, the source base station 135 can send a reestablishment preparation message to the terminal 110. The reestablishment preparation message can include a security configuration. At 745, the source base station 135 can send a system information acquisition order to the terminal 110. At 750, the terminal 110 can acquire target cell system information corresponding to a target cell on the target base station 155. At 755, the terminal 110 can experience radio link failure. At 760, the terminal can send the random access preamble to the target base station 155 to request reestablishment on the target base station 155. At 765, the target base station 155 can send a packet forwarding request to the source base station 135. At 770, the source base station 135 can forward packets to the target base station 155. At 775, the target base station 155 can send a random access response to the terminal 110. At 780, the terminal can apply the security configuration. At 785, the terminal can send a radio resource control connection reestablishment complete message to the target base station 155. At 790, the target base station 155 can send a path switch message to the mobility management entity 510. At 795, the target base station 155 can transmit buffered packets to the terminal 110.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a mobile station, the method comprising:
    establishing, using one or more processors, a connection to a first cell;
    determining, using the one or more processors, whether or not the mobile station is allowed to access a potential reestablishment cell;
    based on the mobile station being allowed to access the potential reestablishment cell, receiving, at the mobile station and using the one or more processors, an assignment of a random access preamble and a random access response identifier from the first cell, the random access preamble being dedicated for use in the potential reestablishment cell, and maintaining the connection to the first cell after receiving the assignment of the random access preamble and the random access response identifier;
    determining, using the one or more processors, that a radio link failure of the connection to the first cell has occurred after receiving the assignment of the random access preamble and the random access response identifier;
    transmitting, using the one or more processors, the random access preamble to the potential reestablishment cell in response to determining that the radio link failure of the connection to the first cell has occurred; and
    receiving, from the potential reestablishment cell, a random access response message identified by the random access response identifier.

2. The method according to claim 1 further comprising:
    sending a measurement report to the first cell, the measurement report indicating the presence of a second cell;
    wherein receiving comprises receiving, at the mobile station after sending the measurement report, the assignment of the random access preamble from the first cell for use in the potential reestablishment cell.

3. The method according to claim 2, wherein the measurement report indicates the presence of a home cell.

4. The method according to claim 1 further comprising:
    receiving a gap assignment for system information acquisition prior to determining that radio link failure has occurred; and
    acquiring system information for the potential reestablishment cell by using the gap assignment.

5. The method according to claim 1 wherein receiving the assignment of the random access preamble from the first cell for use in the potential reestablishment cell includes receiving an assignment of a cell radio network temporary identifier.

6. The method according to claim 5 further comprising:
    receiving a random access response message in response to transmitting the random access preamble; and
    receiving a message to configure a connection to the potential reestablishment cell without a request from the mobile station to configure the connection.

7. The method according to claim 1 wherein receiving the assignment of the random access preamble from the first cell for use in the potential reestablishment cell includes receiving security configuration information for use in the potential reestablishment cell.

8. The method according to claim 7 further comprising:
    receiving a response to the random access preamble from the potential reestablishment cell;
    applying the security configuration; and
    transmitting a message indicating completion of reestablishment after applying the security configuration.

9. The method according to claim 1, wherein a radio link failure comprises a condition in which signaling from a serving base station cannot be received.

10. A method in a target base station, the method comprising:
    determining, using one or more processors, whether or not a mobile station is allowed to access the target base station;
    based on the mobile station being allowed to connect to the target base station, receiving, using the one or more processors, a random access preamble from the mobile station after a radio link failure of a connection between the mobile station and a source base station, the random access preamble being assigned to the mobile station prior to the radio link failure and dedicated for use in the target base station;
    identifying, using the one or more processors, the source base station to which the mobile station was previously connected, wherein the identification is performed based on at least the received random access preamble;
    determining, using the one or more processors, a random access response identifier, wherein the random access response identifier is determined based on the source base station; and
    transmitting, using the one or more processors, a random access response message identified by the random access response identifier.

11. The method according to claim 10, the method further comprising:
    transmitting from the target base station to the source base station a request to forward packets, associated with the mobile station transmitting the random access preamble by:
        receiving from a source base station an indication of assignment of the random access preamble to the mobile station; and
        transmitting to the source base station a request to forward packets in response to receiving the random access preamble from the mobile station.

12. The method according to claim 11 further comprising:
determining a mobile station identifier that identifies the mobile station transmitting the random access preamble;
transmitting a response message addressed to the mobile station identifier; and
transmitting a message to configure a connection between the target base station and the mobile station without a request from the mobile station to configure the connection.

13. The method according to claim 12, wherein determining the mobile station identifier comprises receiving, from the source base station, the mobile station identifier that identifies the mobile station.

14. An apparatus comprising:
memory;
one or more processors coupled to the memory;
a wireless communication device housing;
an admission control module configured to determine whether or not the apparatus is allowed to access a potential reestablishment cell;
a transceiver coupled to the wireless communication device housing, the transceiver configured to establish a connection to the first cell, to receive an assignment of a random access preamble and a random access response identifier from the first cell, the random access preamble being dedicated for use in the potential reestablishment cell, based on the mobile station being allowed to access the potential reestablishment cell, and to maintain the connection to the first cell after receiving the assignment of the random access preamble and the random access response identifier;
a controller coupled to the transceiver, the controller configured to control operations of the apparatus and configured to process the assignment of the random access preamble;
a radio link failure determination module coupled to the controller, the radio link failure determination module configured to determine that a radio link failure of the connection to the first cell has occurred after the transceiver receives the assignment of the random access preamble and the random access response identifier;
wherein the controller is configured to transmit, via the transceiver, the random access preamble to the potential reestablishment cell in response to determining that the radio link failure of the connection to the first cell has occurred and to receive, from the potential reestablishment cell, a random access response message identified by the random access response identifier.

15. The apparatus according to claim 14:
wherein the controller is configured to send, via the transceiver, a measurement report to the first cell, the measurement report indicating the presence of a second cell; and
wherein the transceiver is configured to receive, after sending the measurement report, the assignment of the random access preamble from the first cell for use in the potential reestablishment cell.

16. The apparatus according to claim 14:
wherein the transceiver is configured to receive security configuration information for use in the potential reestablishment cell and is configured to receive a response to the random access preamble from the potential reestablishment cell; and
wherein the controller is configured to apply the security configuration and is configured to transmit, via the transceiver, a message indicating completion of reestablishment after applying the security configuration.

* * * * *